United States Patent [19]

Lang

[11] 3,769,740
[45] Nov. 6, 1973

[54] CHUM DISPENSING DEVICE
[76] Inventor: Albert F. Lang, 20 Emerson Ter., Bloomfield, N.J.
[22] Filed: May 10, 1972
[21] Appl. No.: 251,943

[52] U.S. Cl. .............................................. 43/44.99
[51] Int. Cl. ............................................ A01k 97/02
[58] Field of Search ...................... 43/44.99, 42.06, 43/44.9, 55

[56] References Cited
UNITED STATES PATENTS
3,686,787  8/1972  Milovich ............................. 43/44.9
3,705,465  12/1972  Charney ............................. 43/42.06
3,654,724  4/1972  Charron ............................. 43/42.06
2,949,691  8/1960  Johnson .................................. 43/55

*Primary Examiner*—Louis G. Mancene
*Assistant Examiner*—Gregory E. McNeill
*Attorney*—Richard N. Miller et al.

[57] ABSTRACT

A chum dispensing device comprising a buoyant chum holder and dispenser on a leader line which optionally has a connector on its free end. A preferred chum dispensing device comprises the buoyant chum dispensing device in combination with a carrier sinker therefor.

14 Claims, 7 Drawing Figures

PATENTED NOV 6 1973    3,769,740
SHEET 1 OF 2
Fig.1
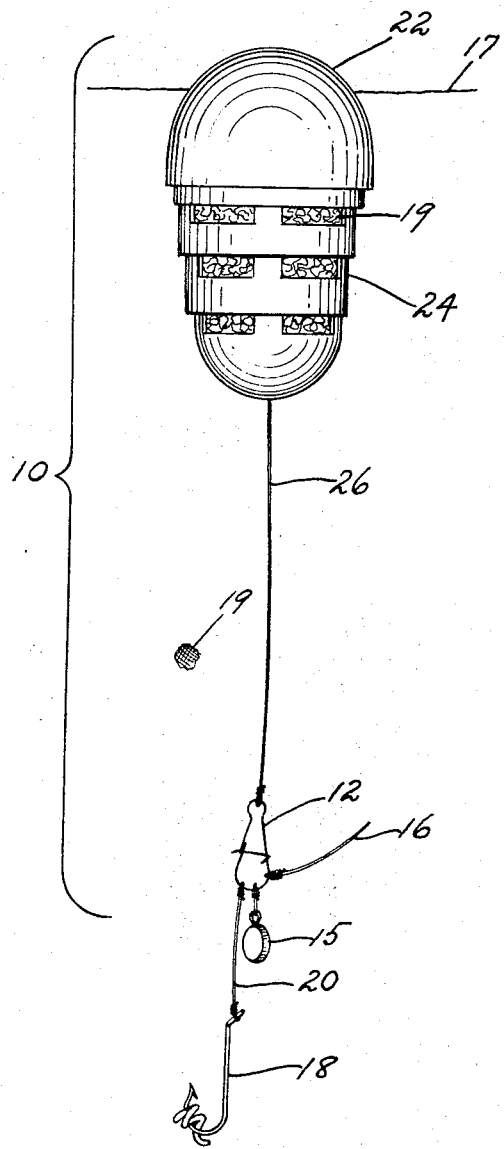
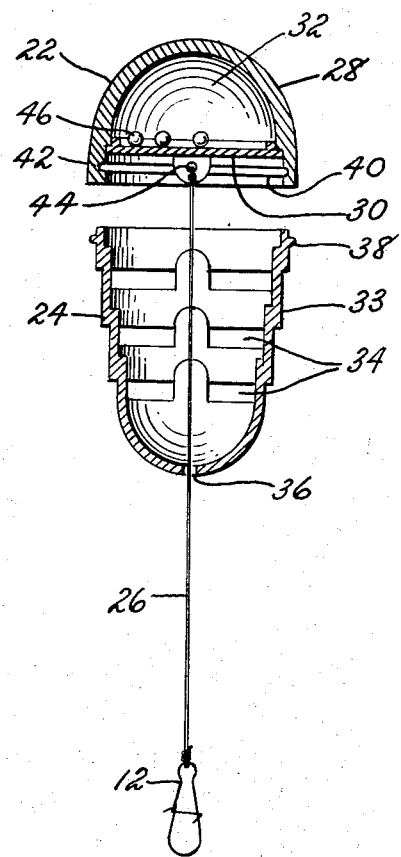
Fig.2
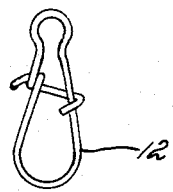
Fig.4
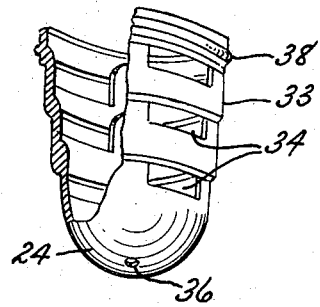
Fig.3

PATENTED NOV 6 1973 3,769,740
SHEET 2 OF 2
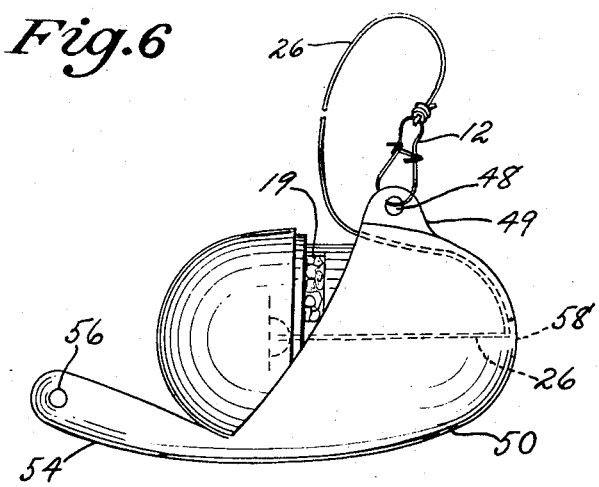
Fig.6
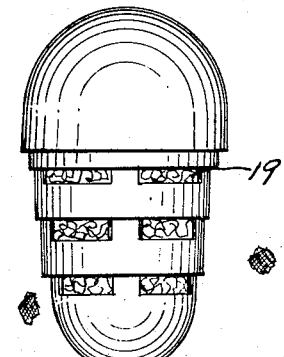
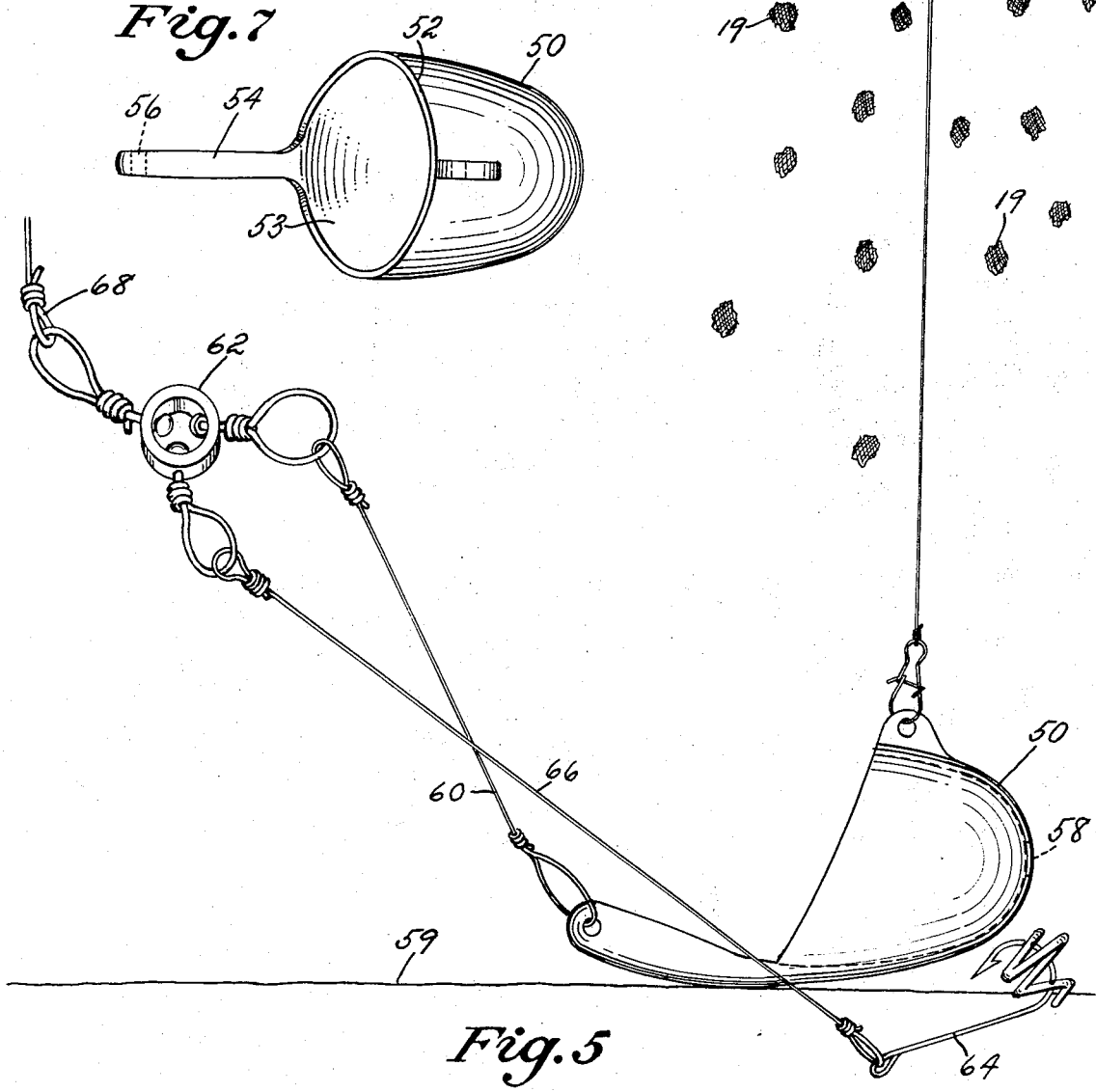
Fig.7
Fig.5

CHUM DISPENSING DEVICE

BACKGROUND OF INVENTION

This invention relates to a chum dispensing device which is adapted for use in surface fishing and bottom fishing. More particularly, this device serves as a surface float which releases chum when surface fishing and, in combination with a unique carrier sinker, releases chum at a predetermined distance from the bottom when bottom fishing.

The advantages of using chum, i.e., pieces of ground up fish, as a means of attracting fish prior to their being caught by net or hook are well known; and many devices have been employed to dispense and distribute the chum. For example, the chum pot is widely used by anglers fishing from a boat. In addition, fishermen have employed buoyant chum dispensing devices as well as chum dispensing sinker devices when surface fishing, bottom fishing, and trolling. Thus, a wide variety of chum dispensing devices are presently in use or are available to fishermen.

Although a large number of chum dispensing devices are available, many of these devices exhibit a number of shortcomings. More specifically, some of the devices are quite complex and, therefore, are difficult and expensive to manufacture. Also, some of the buoyant chum dispensers require special chum pellets and others are subject to loss of the chum reservoir in the event of separation of the reservoir from the buoyant portion during use. In addition, many of the chum dispensers, both buoyant-type and sinker-type, are difficult to control in casting because of their size and/or shape. Finally, many of the known devices do not effectively dispense the chum in the area of the baited hooks.

In view of the shortcomings discussed above, a number of factors are apparent which must be considered and integrated in order to achieve a chum dispensing device that may effectively attract fish in both surface and bottom fishing, that may be readily cast, that will distribute chum in the area of the baited hook, that will be protected against loss during usage, and that will be simple and efficient to manufacture.

SUMMARY OF THE INVENTION

The present invention provides a chum dispensing device which overcomes the aforementioned disadvantages. Generally, the described chum dispensing device which is adapted for attachment to a fishing line comprises float means; means for holding and dispensing chum, said chum-holding-and-dispensing means having an opening at its lower end and being detachably secured to the bottom of the float means; means on the bottom of the float means for attaching the float means to a leader line; and a predetermined length of leader line passing through the opening in the bottom of the means for holding chum and attached to the means for attaching whereby the float means and means for holding chum are interconnected and retained on the leader line.

A further aspect of the present invention is a chum dispensing device which comprises the buoyant chum dispensing combination of float means and chum-holding-and-dispensing means in further combination with a sinker which is preferably shaped to form a carrier for the combined float means and chum-holding-and-dispensing means.

The described buoyant chum dispensing device is simple, is compact and can be efficiently mass produced. Also, the device is easy to charge or load with chum, even in the dark; and the interconnection of the float means and means for holding and dispensing chum on a single, predetermined length of leader line protects the user against separation and/or loss of either component during loading. This same interconnection also prevents separation and the consequent loss of the chum reservoir during use. Further, the design of the chum dispenser and interconnecting leader line of predetermined length together with the attached line connector enables the angler to achieve distribution of the chum in the area of the baited hook in top and bottom fishing.

As mentioned, the chum dispensing device can be used in all types of fishing, i.e., surface fishing, sub-surface fishing and bottom fishing. More particularly, the buoyant chum dispensing device in combination with a light weight sinker can be used in surface fishing. By adding additional sinkers or sinker weight, the device may be used to fish at levels intermediate between the surface and the bottom of the particular body of water. In combination with a heavy sinker such as the carrier sinker, the chum dispensing device is suitable for use in bottom fishing. Finally, by employing a leader line of extended length having at least two hooks at different points and a light sinker, the chum dispensing device enables fishermen to fish simultaneously at surface and sub-surface levels.

In addition, when the device is made of suitably colored material and further includes means for making a rattling sound or other type of noise, a device is achieved which attracts fish by appealing to their smell, sight and hearing.

BRIEF DESCRIPTION OF THE DRAWINGS

Specific embodiments of the invention have been chosen for purposes of illustration and description and are shown in the accompanying drawings wherein:

FIG. 1 is a side elevation view of a chum dispensing device of the present invention installed on a fishing line carrying a baited hook and afloat in the water;

FIG. 2 is a central longitudinal section of the chum dispensing device of FIG. 1 with the float means disengaged from the chum holding and dispensing means;

FIG. 3 is an isometric view, partially cut away, of the chum holder and dispenser of FIG. 2;

FIG. 4 is an enlarged side elevation view of the snap connector of FIG. 1;

FIG. 5 is a side elevation view of the chum dispensing device of FIG. 1 in combination with a carrier sinker, all installed on a fishing line carrying a baited hook;

FIG. 6 is a side elevation view of the combination chum dispensing device and carrier sinker of FIG. 5 prior to casting; and FIG. 7 is a top view of the sinker of FIG. 5.

DETAILED DESCRIPTION OF THE DRAWINGS

Referring to FIG. 1, the chum dispensing device 10 of this invention is connected by snap connector 12 to fishing line 16. The chum dispensing device 10 is floating at the surface of the water 17 above the baited hook 18 on leader 20 which is connected to snap connector 12. FIG. 4 depicts an enlarged view of snap connector 12. A leader carrying a conventional light sinker 15 also is connected to snap connector 12.

As shown in FIGS. 1 and 2, the chum dispensing device comprises a float 22, a chum holder and dispenser 24, a length of leader line 26, and a snap connector 12. The chum holder and dispenser 24 is semi-ovoidal in shape and in combination with float 22 forms a generally egg-shaped device.

FIGS. 1 and 2 show that the float 22 is constituted of a hemispherical shell member 28 and a circular closure member 30 adhesively secured thereto to form an airtight chamber 32 within shell 28. The chamber 32 provides the desired amount of buoyancy to cause the chum dispensing device to float at the surface of the water 17.

As shown in FIGS. 1 to 3, the chum holder and dispenser 24 comprises an outer shell 33 having a plurality of chum vents 34 therein and opening 36 at its lower end. The chum vents 34 are generally rectangular in shape. The chum holder and dispenser 24 is detachably connected to float 22. This detachable connection consists of an external bead 38 located near the top of shell 33 and a cooperating or corresponding groove 40 on the inner surface of the lower flange 42 of float 22. The flange 42 is the portion of shell 28 which extends below the plane of closure member 30. The outer leading edge of shell 33 and the inner leading edge of flange 40 are slightly tapered to facilitate connection and disconnection.

Integrally connected to the bottom of closure member 30 at the center thereof is a protrusion containing eye 44. A predetermined length of leader line 26 passes through opening 36 in the chum holder and dispenser as shown in FIG. 2 and the upper end thereof is passed through eye 44 and then formed into a knot. In this manner, the float 22 and the chum holder and dispenser 24 are interconnected on leader line 26. The lower end of leader line 26 is knotted to snap connector 12 to insure retention of the buoyant chum dispenser thereon and to facilitate connection to a fishing line or suitable connecting link, e.g., swivel, on such line. Generally, the leader line will be made of monofilament or braided nylon or twisted linen.

When the chum dispensing device 10 is used as shown in FIG. 1, it functions as a float and at the same time the action of water passing through chum vents 34 disintegrates part of the chum 19 and distributes the particles in the area of the baited hook 18. Some of the chum 19 dissolves in the water and forms a chum slick which also lures the fish through their keen sense of smell into the area. After the detached chum holder is charged with chum and re-attached to float 22, the chum dispensing device 10 is positioned in the water by dropping in still fishing or by casting for a short distance.

To further improve its effectiveness, the buoyant chum dispensing device may be formed of a colored material such as plastic, preferably containing silver-colored speckles, to provide a lure which visually attracts the fish. A bright red color is recognized as being particularly advantageous for surface lures. By including pellets or spheres 46 of metal, plastic, ceramic or wood in the airtight hollow chamber 32, the device will produce a rattle due to the action of the water thereby forming vibrations in the water which also serve to lure fish.

FIGS. 5 and 6 show the buoyant chum dispensing device 10 connected through snap connector 12 to eye 48 in flange 49 of carrier sinker 50. As shown in FIGS. 5-7, sinker 50 is distinctively shaped and comprises a housing 52 of bullet shape having an integral handle-like extension 54 at the back side. Extension 54 contains an aperture 56 through which a leader 60 passes as shown in FIG. 5. Housing 52 encloses a chamber or cavity 53 which accommodates the assembled float 22 and chum holding and dispensing container 24. The flange 49 is located on top of housing 52 at a point about 180° from integral extension 54. Desirably, an opening 58 is provided in the housing member 52 to facilitate drainage of the water therefrom as it is removed from the water.

In use, the detached chum holder 24 is filled with chum 19 and attached to float 22, and the chum dispensing device 10 including leader 26 and snap connector 12 is inserted into the carrier sinker 50 as illustrated in FIG. 6. Preferably, snap connector 12 on leader 26 is secured to sinker 50 through eye 48 before the chum-holding-and-dispensing container 24 is inserted into chamber 53. Sinker 50 in turn is secured by a leader 60 passing through eye 56 to a common swivel connector 62 attached to a fishing line 68, preferably of monofilament nylon. A baited hook 64 on leader 66 which is preferably of metal when fishing for fish with sharp teeth also is connected to swivel 62. The chum dispensing device 10 in carrier sinker 50 and the baited hook are cast to the desired spot in the water and sinker 50 settles to the bottom 59, taking with it baited hook 64. As sinker 50 settles, the buoyancy of float 22 and the action of the water causes the chum dispensing device 10 to be disengaged or dislodged so that it floats above the sinker and the baited hook as shown in FIG. 5. In this manner, chum 19 is dispensed in an area proximate to the baited hook when bottom fishing.

In bottom fishing as in top fishing, the chum dispensing device generally will be suitably colored, the color being selected from the group of orange, yellow and white depending upon the depth. While red is preferred for surface fishing, orange is preferred for depths of 10 to 20 feet and yellow and white are preferred for depths greater than 20 feet. Again, visual attractiveness to fish may be further enhanced by the inclusion of silver-colored speckles in the colored material. Also, pellets designed to produce a rattle or vibrations in the water may be included within float chamber 32.

Although the chum dispensing device 10 has been illustrated in use in both surface fishing and bottom fishing, it should be recognized that it may also be employed for fishing at intermediate depths. As mentioned, by properly integrating and adjusting the buoyancy of float 22 with the weight of a line sinker, a fisherman can fish at locations intermediate between the surface and the bottom. In fact, by using a leader with two or more hooks at different locations and a light sinker, fishing may be done simultaneously at surface and sub-surface levels.

The described chum dispensing device is preferably manufactured from a suitably colored plastic material. Suitable plastic materials include thermosetting and thermoplastic resins, with the latter being preferred for injection molding. Satisfactory thermoplastic resins include cellulose acetate, cellulose acetate butyrate, nylon, polycarbonate, polyethylene, polypropylene, polystyrene, tetrafluorethylene, and vinylidene chloride resins, with polystyrene being preferred. In manufacturing, shell 28, closure member 30 and chum holder and dispenser 24 are cast simultaneously in a three pocket mold using standard injection molding techniques. The design of chum holder and dispenser 24 facilitates its manufacture using a stationary female die and a movable male die having a stepped shape, thereby achieving an economic manufacturing process.

Sinker 50 is generally made of metal such as zinc alloy or lead. Preferably, the sinker may be chrome plated to provide durability and to make it visually more attractive to fish.

It should be emphasized that the combination of the buoyant chum dispenser and the carrier sinker provides a compact unit which can be cast without great difficulty and with a fair degree of accuracy. Clearly, such a unit avoids the disadvantages of a separate sinker and a separate chum dispenser which tend to wobble in the air causing tangling and reduced casting distance. Further, accuracy is promoted by the bullet-shaped design of housing 52 of sinker 50.

As suggested, the shape and size of float 22, as well as the material of construction, may be varied as desired. For example, float 22 may be solid rather than hollow and, in solid form, may be made of wood, cork or foamed plastic material, e.g., foamed polystyrene. In addition, a square, rectangular or polygonal cross section may be substituted for the circular cross section exemplified. Similarly, the over-all shape may be changed from the egg shape to a cylindrical, cubic or oblong shape. However, such shapes are more expensive to manufacture because they require more material and are more difficult to cast.

Variations are also possible in the shape of the chum vents. The illustrated vents are of rectangular shape to facilitate molding and manufacturing. In fact, the dimensions of the individual rectangular vents as well as the number of vents may be changed without a significant adverse effect on the manufacturing process. However, substitution of either circular or triangular vents would complicate the molding process somewhat and would, therefore, be less desirable.

In like manner, the design of the sinker is variable. For example, the sinker may be in the shape of a fishhook, with the chum dispenser having a hollow center section to fit over the upstanding prong of the hook. Alternatively, the carrier sinker might be in the shape of a thimble or a bell. The latter two shapes obviously would facilitate casting.

The snap connector likewise may be replaced by other equivalent conventional connectors employed by anglers. This particular type of connector is preferred because it is simple to use and inexpensive to manufacture, yet forms a secure and positive connection.

Furthermore, other equivalent means for attaching the float means to the means for holding and dispensing chum may be employed. For example, at least two projections on one of these parts can cooperate with and be interlocked into a similar number of female cavities on the other part. The male projection will be inserted into a vertical groove or slot in the other part, pushed upward or downward, and turned in either direction through a horizontal slot to be locked into the offset female cavity. Other attaching means also will be apparent to those skilled in the art.

Although not illustrated, optionally, leaders bearing baited hooks could be connected directly to the chum dispensing device through eye 44. Alternatively, leaders carrying baited hooks may be attached to the ribs separating the chum vents.

While the preferred buoyant chum dispensing device 10 is illustrated with means for attaching, i.e., eye 44, integral with float 22 so that the float and dispenser are interconnected on a common leader, the means for attaching could be made integral with the dispenser 24. In such an embodiment, means for attaching such as the integral eye would be substituted for opening 36 in dispenser 24. The resultant chum dispensing device could be employed in combination with the carrier sinker. Of course, the design of the sinker obviously would be modified to accommodate the relocated integral eye serving as the means for attaching either by increasing the size of opening 58 or by redesigning the interior of the sinker chamber. It should be recognized that relocation of eye 44 to the bottom of dispenser 24 would result in a device in which the upper float could be lost when in use.

While this invention has been described with reference to certain embodiments, it is not intended that such embodiments shall be limitations upon the scope of the invention. It will be obvious to those skilled in the art that other modifications and variations can be made and various equivalents substituted therein without departing from the principles disclosed.

What is claimed is:

1. A chum dispensing device adapted to be attached to a fishing line which comprises float means; means for holding and dispensing chum, said chum holding and dispensing means having an opening at its lower end and being detachably secured to the bottom of said float means; means on the bottom of said float means for attaching said float means to a leader line; and a predetermined length of leader line passing through said opening in the bottom of said means for holding chum and attached to said means for attaching whereby said float means and said means for holding chum are interconnected and retained on said leader line.

2. A chum dispensing device in accordance with claim 1 wherein said float means is an airtight chamber and said means for holding and dispensing chum is a hollow container having a plurality of openings therein.

3. A chum dispensing device in accordance with claim 1 which further includes a line connector secured to the free end of said length of leader line.

4. A chum dispensing device in accordance with claim 2 wherein said hollow container is of a semi-ovoidal shape with a plurality of rectangular openings therein and the detachable connection consists of a bead on said container and a corresponding groove in a lower flange on said float means.

5. A chum dispensing device in accordance with claim 4 which further includes a snap connector secured to the free end of said length of leader line, said leader line being less than about three feet in length.

6. A chum dispensing device in accordance with claim 5 wherein said float means and said container are made of a colored plastic material, said colored plastic being white, yellow, orange or red.

7. A chum dispensing device in accordance with claim 5 which further includes means for producing a rattling sound within said airtight chamber.

8. A chum dispensing device in accordance with claim 6 wherein the plastic material is red and has silver-colored speckles therein.

9. A chum dispensing device in accordance with claim 1 which further includes a sinker connected to the free end of said length of leader line with chum dispenser attached, said sinker having thereon means for attaching to a fishing line.

10. A chum dispensing device in accordance with claim 9 wherein said sinker is shaped to form a carrier for the combination of said float means and said chum-holding-and-dispensing means.

11. A chum dispensing device in accordance with claim 10 wherein said combination is egg-shaped and said sinker is bullet-shaped.

12. A chum dispensing device in accordance with claim 6 which further includes a sinker connected to said snap connector and wherein said sinker is bullet-shaped and adapted to serve as a carrier for the combination of said float means and said container during the casting of a fishing line to which said sinker is attached.

13. A chum dispensing device in accordance with claim 12 which further includes means for producing a rattling sound within said airtight chamber.

14. A chum dispensing device adapted to be attached to a fishing line which comprises float means; means for holding and dispensing chum detachably secured to said float means; means for attaching to a leader line located on the bottom of the chum-holding-and-dispensing means; a predetermined length of leader line attached to the means for attaching; a snap connector secured to the free end of said length of leader line; and a sinker connected to said snap connector, said sinker being shaped to form a carrier for the combination of said float means and said chum-holding-and-dispensing means.

* * * * *